United States Patent [19]

Resnick

[11] Patent Number: 5,052,146
[45] Date of Patent: Oct. 1, 1991

[54] FISHING EQUIPMENT

[76] Inventor: Joseph A. Resnick, R.D. 1, Box 415-A, Natrona Heights, Pa. 15065

[21] Appl. No.: 53,052
[22] Filed: May 22, 1987
[51] Int. Cl.⁵ .............................................. A01K 97/10
[52] U.S. Cl. ................................................... 43/21.2
[58] Field of Search ........................................ 43/21.2

[56] References Cited

U.S. PATENT DOCUMENTS

| | | | |
|---|---|---|---|
| 1,451,732 | 4/1923 | Hipwood | 43/21.2 |
| 2,576,624 | 11/1951 | Miller | 43/21.2 |
| 2,803,387 | 9/1957 | Pearce | 43/21.2 |
| 2,995,855 | 8/1961 | Bell | 43/21.2 |
| 3,021,101 | 2/1962 | Gliebe | 43/21.2 |
| 3,653,144 | 4/1972 | Rocka | 43/21.2 |
| 4,257,181 | 3/1981 | Cooper | 43/21.2 |

Primary Examiner—Richard K. Seidel

[57] ABSTRACT

A manufacture including holding means for holding a fishing pole, and attachment means for attaching the holding means to the body of a fisher. The pole carries a reel connected to the pole by way of a stem of the reel. When a fish is brought in, the pole is placed in the holding means, with the stem of the reel held in a locking means. As a result, both hands are free for removal of a hook from the fish.

5 Claims, 2 Drawing Sheets

FISHING EQUIPMENT

TECHNICAL FIELD

The present invention relates to the field of sport fishing.

DISCLOSURE OF INVENTION

A longstanding problem in and during the act of sport fishing has been removing the captured fish from the hook and pole, after the fish has been caught and landed. The present method of dealing with placement of the fishing pole, once the fish has been brought in and the hook must be removed, requires that the fisherman place the pole either under one of the arms, between the legs, or somewhere proximate to his immediate position, in order that he may use both hands to dislodge the hook and line from the fish. This necessity presents a problem for anglers who are wading in fishing streams, and for people standing on banks, or sitting or standing in boats, as well. In many instances, because both hands are required to remove the fish, the angler may lose his equipment, fall overboard (in the case of fishing from a boat), or fall into the water, while wading.

It is an object of the invention to enable the rapid and efficient, temporary storage of the fishing pole, such that both the fisherman's hands become free whenever desired.

This, as well as other objects which will become apparent in the discussion that follows, is achieved according to the present invention by a manufacture including holding means for holding a fishing pole, and attachment means for attaching the holding means to the body of a fisher.

MODES FOR CARRYING OUT THE INVENTION

Figure 1:
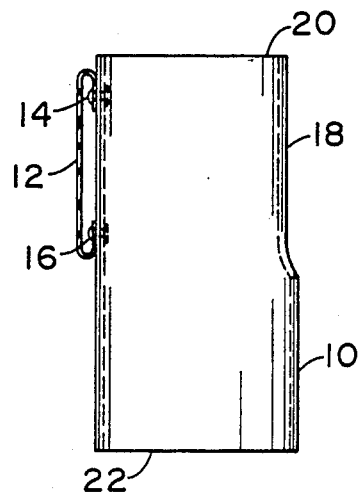

With reference to FIG. 1, showing a side view of a manufacture according to the invention, it will be seen that the illustrated embodiment of the manufacture is constructed of PVC pipe 10 and a canvas loop 12 held to the pipe by rivets 14 and 16. The pipe is provided with a slot 18 extending from its top end 20 downwards.

Figure 2:
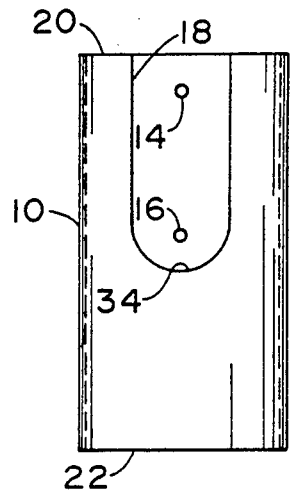

FIG. 2 is a front view of the manufacture and provides a full display of slot 18.

Figure 3:
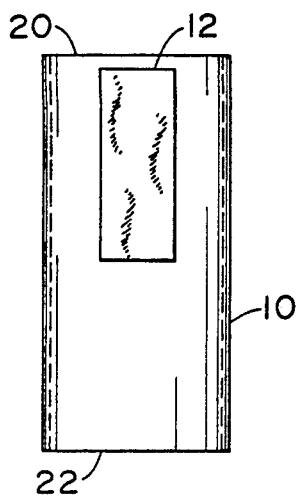
FIGS. 1, 2, 3 and 4 are side, front, back and top views, respectively, of a manufacture of the invention.

FIG. 3 is a back view, directly onto loop 12.

Figure 4:
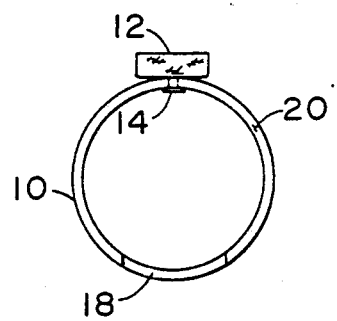

FIG. 4 is a top view, down into the manufacture. The top end 20 is shown with a larger diameter than the lower end 22, to reflect the lesser distance of end 20 to the viewer.

Figure 5:
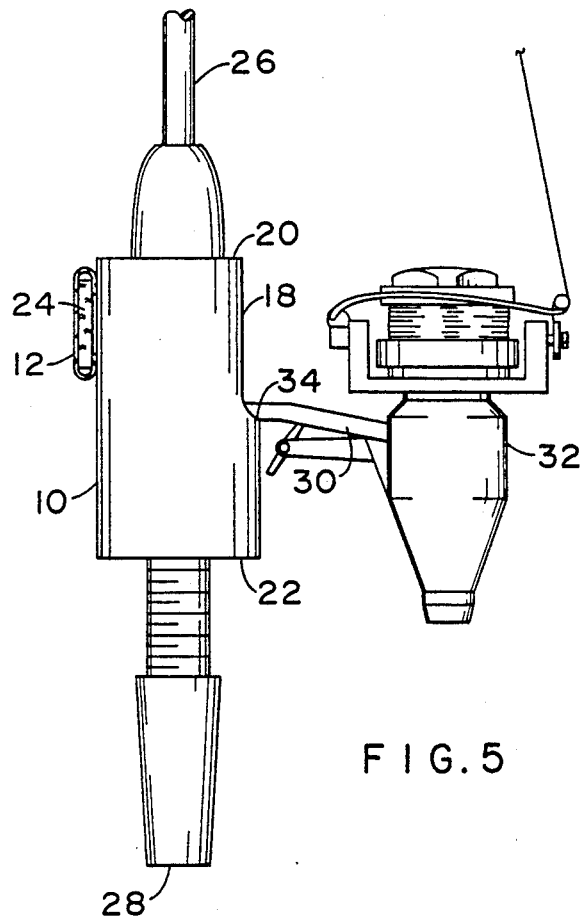
FIG. 5 is a detail, side view of the manufacture of the invention, in use for supporting a fishing pole on the belt of a fisher.

FIG. 5 illustrates the manufacture of FIGS. 1 to 4 in side view being carried on a belt 24 such as would be worn on the waist of a fisher, strung through loops on the top edge of trousers. Also shown is a spinning-reel-equipped fishing pole 26. Butt end 28 of the pole has been lowered down through pipe 10, moving from top end 20, past it and down past lower end 22, to its position as shown. Stem 30 of the spinning reel 32 has come to rest against the lower end 34 of slot 18.

Figure 6:
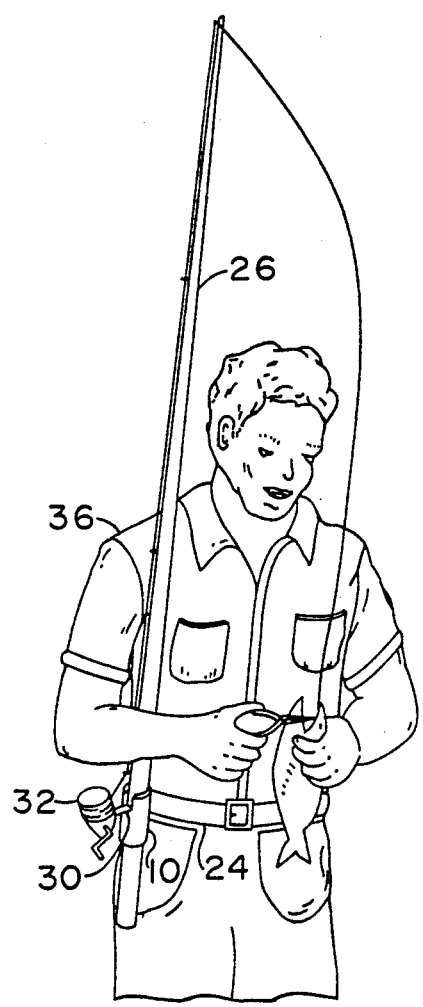
FIG. 6 is a general view showing the manufacture of the invention, in use by a fisher.

FIG. 6 provides a possible placement of FIG. 5 relative to a fisher 36. Pipe 10 is situated on belt 24 just forward of the fisher's right-back pocket. The fisher is shown after he has brought a fish in. Both of his hands are free for removing the hook from the fish, since he has set pole 26 into pipe 10, in the manner of FIG. 5. He is holding the fish with his left hand and bringing a pair of pliers into action with his right hand to facilitate removal of the hook.

Slot 18 assists in locking the pole in its seat in pipe 10. The slot lowers the center of gravity of the pole in the pipe and prevents rotation of the pole in the pipe.

Pipe 10 will be dimensioned as a function of the fishing poles it is intended to seat. In general, its inner diameter will range from 1 to 2 inches, and its length will be from 3 to 4 inches. Slot 18 will be around 2 to 2½ inches deep and ½ inch wide.

The instant manufacture is fabricated very easily. The builder must locate a length of polyvinylchloride (PVC) pipe of approximately 1½ inches diameter and approximately 4 inches in length. PVC pipe is durable, easily available commercially, and otherwise nicely suitable as a material for fabrication of the manufacture of the invention. Rather than starting from pipe stock, a basic pipe form may be made by the process of plastic injection molding. The builder should designate a top and bottom, as the strapping mechanism (belt loop or rigid metal hook) will be added using "pop" rivets during the final phase of the construction process. After top and bottom designation, the builder should fashion (cut) the slotted locking mechanism. This aspect of the manufacture is very significant in that the slot, cut approximately 2 inches deep and ½ inches wide (through one sidewall only—that designated as the "front"), enables the angler to securely place the fishing pole, specifically the stem support portion of the reel-holding apparatus, into the cylinder, and simultaneous placement of the stem of the fishing reel into the lock, resulting in stable vertical placement of the combined apparatus. This aspect insures safety of both equipment and angler during the capture/recovery process.

Rather than a loop 12, the builder may desire to use a semi-rigid steel, plastic, polymer, or nylon (VELCRO interlocking-fiber fastening system, for example) substance to enable placement on the body. Another option is a spring clip. Suffice it to say that the manufacture must be attached to the user's body and alternative means of attachment will be apparent to persons reasonably skilled in the art of fabrication.

Besides being useful for freeing both hands for hook removal from a caught fish, the invention is also useful for servicing the fishing line in general, for instance for freeing both hands for tying leader to the main line, for tying a hook to the line or leader, whether a lure-equipped hook or a bait hook, for removing a hook, etc..

The rigidity of the PVC pipe 10 provided by its wall thickness of, for example, ⅛th inch is advantageous as compared to a cloth pipe, or loop, sewn on a fishing vest for at least two reasons: the rigidity permits easy insertion and withdrawal of the butt end 28 of a fishing pole, as compared with the tendency of a butt end to get entangled in a cloth pipe, and the rigidity, combined with the spacing of the rivets 14 and 16 and the mounting on a belt 24, provides sufficient resistance to torque resulting should the center of gravity of the pole-reel combination be above pipe 10, that the pole is held nevertheless upwards, as shown in FIG. 6.

Figure 7:
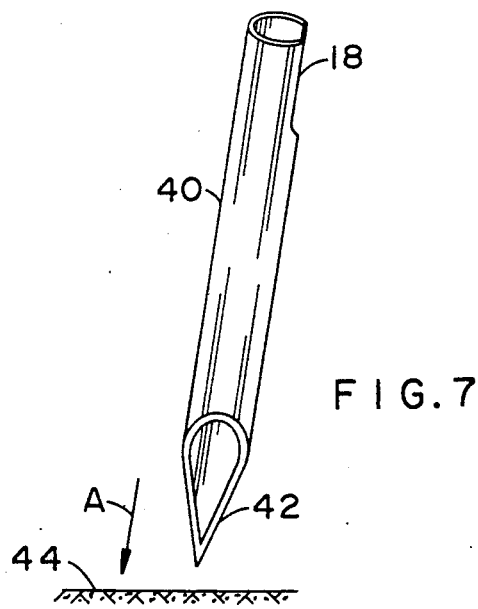
FIG. 7 is a side view of a development of the invention.

FIG. 7 shows a development of the invention, where a pipe 40 has a slot 18 exactly like the slot 18. The slot in pipe 40 is intended to receive a reel stem of a reel mounted on a fishing pole, in the same manner as shown in FIG. 5. Unlike pipe 10, pipe 40 is provided with a pointed lower end 42, the point being formed either by corresponding cutting away of portions of the lower end of the pipe or by injection molding into an appropriately shaped mold. By forming pipe 40 of metal, its wall thickness can be thinner, to ease pushing of the pipe in the direction of arrow A into the soil of a bank 44 by a stream or lake. Pipe 40 is made for example 14 inches long, so that it can be pushed for example 5 inches deep into the soil for stable emplacement, with 9 inches remaining above the soil, to hold a fishing pole otherwise in the same way as illustrated in FIG. 5. This development of the invention holds the fishing pole of a bank fisher, thereby freeing the hands for other tasks.

I claim:

1. A manufacture comprising holding means for holding a fishing pole, and attachment means for attaching the holding means to the body of a fisher, the holding means including locking means for lowering the center of gravity of a pole in the holding means and for preventing rotation of the pole in the holding means by cooperating with a reel on the pole, the holding means having a side near to the body and a side far from the body when attached to the body of a fisher, the locking means being on the side far from the body.

2. A method of using a manufacture as claimed in claim 1, said method comprising attaching, by the attachment means, the holding means to one's body, fishing for a fish with a fishing pole, the pole carrying a reel connected to the pole by way of a stem (30) of the reel, and placing the pole in the holding means, with the stem of the reel in the locking means, after a fish has been brought in, whereby both hands are free for removal of a hook from the fish.

3. A method of using a manufacture as claimed in claim 1, said method comprising attaching, by the attachment means, the holding means to one's body, placing a fishing pole in the holding means, the pole carrying a reel connected to the pole by way of a stem (30) of the reel, the stem of the reel being in the locking means, and servicing the line of the pole, with both hands being free for such purpose.

4. A manufacture comprising a pipe and attachment means for attaching the pipe to the body of a fisher such that one side of the pipe is near the body of the fisher and an opposite side of the pipe is far from the body of the fisher, whereby the butt end of a fishing pole may be inserted downwardly into the pipe when the pipe is attached to the body of a fisher, for holding the pole and freeing both hands of the fisher for tasks other than holding the pole, the pipe having a slot in the far side of the pipe extending from a top end of the pipe downwardly, whereby the center of gravity of the pole in the pipe is lowered, and a reel on the pole will be held in the slot for preventing pole rotation.

5. A manufacture as claimed in claim 4, the pipe comprising polyvinylchloride.

* * * * *